US012800435B2

(12) United States Patent
Tezuka et al.

(10) Patent No.: US 12,800,435 B2
(45) Date of Patent: Nov. 17, 2026

(54) OPTICAL FIBER CHARACTERISTIC MEASUREMENT DEVICE AND OPTICAL FIBER CHARACTERISTIC MEASUREMENT METHOD

(71) Applicant: Yokogawa Electric Corporation, Musashino (JP)

(72) Inventors: Shin-Ichirou Tezuka, Musashino (JP); Masayoshi Honma, Musashino (JP); Satoshi Matsuura, Musashino (JP)

(73) Assignee: Yokogawa Electric Corporation, Musashino (JP)

( * ) Notice: Subject to any disclaimer, the term of this patent is extended or adjusted under 35 U.S.C. 154(b) by 231 days.

(21) Appl. No.: 18/712,007

(22) PCT Filed: Nov. 14, 2022

(86) PCT No.: PCT/JP2022/042245
§ 371 (c)(1),
(2) Date: May 21, 2024

(87) PCT Pub. No.: WO2023/095661
PCT Pub. Date: Jun. 1, 2023

(65) Prior Publication Data
US 2025/0027840 A1 Jan. 23, 2025

(30) Foreign Application Priority Data
Nov. 29, 2021 (JP) ................................ 2021-192900

(51) Int. Cl.
*G01M 11/00* (2006.01)

(52) U.S. Cl.
CPC ...... *G01M 11/319* (2013.01); *G01M 11/3118* (2013.01)

(58) Field of Classification Search
CPC ............ G01M 11/319; G01M 11/3118; G01M 11/3127; G01M 11/3145; G01K 11/322; G01D 5/35364
See application file for complete search history.

(56) References Cited

U.S. PATENT DOCUMENTS

| | | | | |
|---|---|---|---|---|
| 7,317,194 B2 * | 1/2008 | Atzeni | G01N 21/6408 | 356/318 |
| 2011/0032517 A1 * | 2/2011 | Hotate | G01M 11/334 | 356/73.1 |

(Continued)

FOREIGN PATENT DOCUMENTS

| | | | |
|---|---|---|---|
| JP | H02140639 A * | 5/1990 | G01M 11/3172 |
| JP | 5222514 B2 * | 6/2013 | G01M 11/00 |

(Continued)

OTHER PUBLICATIONS

P. Röjsel, RF MEMS-based wireless architectures and front ends, 2013, Woodhead Publishing Limited, Chapter 7, pp. 207-224 (Year: 2013).*

(Continued)

*Primary Examiner* — Michelle M Iacoletti
*Assistant Examiner* — Judy Dao Tran
(74) *Attorney, Agent, or Firm* — WHDA, LLP

(57) ABSTRACT

An optical fiber characteristic measurement device (1) includes: a first optical splitter (12) that splits frequency-modulated modulated light (L1) into pump light (LP) and reference light (LR); a second optical splitter (16) that causes the pump light to be incident from one end of an optical fiber under test (FUT) and outputs Brillouin scattered light (LS) generated inside the optical fiber under test; a first detector (19) that detects interference light between the Brillouin scattered light output from the second optical splitter and the reference light; an analyzer (20) that obtains a Brillouin gain spectrum which is a spectrum of the (Continued)

1

Brillouin scattered light from a detection signal (S1) output from the first detector; a second detector (22, 31) that detects a double wave component having a frequency that is double a modulation frequency of the modulated light included in an intensity component of each frequency of the Brillouin gain spectrum obtained by the analyzer; and a measurer (23) that measures characteristics of the optical fiber under test on the basis of the double wave component detected by the second detector.

20 Claims, 6 Drawing Sheets

(56) References Cited

U.S. PATENT DOCUMENTS

2019/0195731 A1 6/2019 Furukawa
2020/0124497 A1* 4/2020 Furukawa .......... G01D 5/35306
2021/0215515 A1* 7/2021 Kwon ..................... G01L 1/242
2022/0026287 A1* 1/2022 Murray .................... G01K 3/00
2022/0381589 A1 12/2022 Tezuka et al.

FOREIGN PATENT DOCUMENTS

JP 2016148661 A * 8/2016
JP 6791113 B2 11/2020
JP 2021-089196 A 6/2021

OTHER PUBLICATIONS

Extended (Supplementary) European Search Report dated Nov. 13, 2025, issued in counterpart EP Application No. 22898445.6. (9 pages).
Suzuki, Y. et al., Proposal of Second Harmonic Detection Method in Brillouin Optical Correlation Domain Reflectometry, Optical Fiber Sensors, 2023. (4 pages); cited in Extended European Search Report dated Nov. 13, 2025.

* cited by examiner

OPTICAL FIBER CHARACTERISTIC MEASUREMENT DEVICE AND OPTICAL FIBER CHARACTERISTIC MEASUREMENT METHOD

TECHNICAL FIELD

The present invention relates to an optical fiber characteristic measurement device and an optical fiber characteristic measurement method.

BACKGROUND ART

An optical fiber characteristic measurement device is a device that causes continuous light or pulse light to be incident on an optical fiber under test and detects scattered light or reflected light generated inside the optical fiber under test to measure temperature distribution or distortion distribution of the optical fiber under test in its lengthwise direction, vibration of the optical fiber under test, and other characteristics. In this optical fiber characteristic measurement device, the scattered light or reflected light to be detected changes depending on the physical quantity (for example, temperature or distortion) that influences the optical fiber under test, and thus the optical fiber under test itself is used as a sensor.

One such optical fiber characteristic measurement device is a device using brillouin optical correlation domain reflectometry (BOCDR method). An optical fiber characteristic measurement device using the BOCDR method causes pump light which is modulated light that has undergone frequency modulation to be incident from one end of the optical fiber under test, and detects light obtained by causing Brillouin scattered light emitted from one end of the optical fiber under test and reference light (light that has undergone the same frequency modulation as pump light) to interfere with each other. This device measures the characteristics of the optical fiber under test by obtaining a spectrum of Brillouin scattered light (hereinafter referred to as a "Brillouin gain spectrum") from the obtained detection signal and determining the amount of frequency shift of the Brillouin scattered light with respect to incident light (hereinafter referred to as "the amount of Brillouin frequency shift").

In the optical fiber characteristic measurement device using the BOCDR method, the Brillouin scattered light at a specific position where a "correlation peak" appears in the optical fiber under test is selectively extracted by causing the Brillouin scattered light and the reference light to interfere with each other. Here, by sweeping the modulation frequencies of the pump light and the reference light, the correlation peak can be moved in the lengthwise direction of the optical fiber under test. Therefore, the temperature distribution and distortion distribution in the lengthwise direction of the optical fiber under test can be measured by determining the amount of Brillouin frequency shift at a position where each correlation peak appears while moving the correlation peak. Meanwhile, for details of the optical fiber characteristic measurement device using the BOCDR method, see, for example, the following Patent Documents 1 and 2.

CITATION LIST

Patent Document

Patent Document 1
Japanese Patent No. 6791113
Patent Document 2
Japanese Unexamined Patent Application Publication No. 2021-089196

SUMMARY OF INVENTION

Technical Problem

Incidentally, since the Brillouin scattered light emitted from an optical fiber under test is weak, the Brillouin gain spectrum obtained by the optical fiber characteristic measurement device using the BOCDR method may have noise superimposed thereon or have an unstable baseline (reference line). For this reason, a conventional optical fiber characteristic measurement device using the BOCDR method needs to perform a process for removing noise superimposed on the Brillouin gain spectrum over a long time, which leads to a problem of a long measurement time. In addition, since the baseline is unstable due to level fluctuations in the Brillouin gain spectrum, there is a problem in that it is difficult to perform stable measurement.

The present invention was contrived in view of such circumstances, and an object thereof is to provide an optical fiber characteristic measurement device and an optical fiber characteristic measurement method that make it possible to perform stable measurement in a shorter time than before.

Solution to Problem

In order to solve the above problem, according to an aspect of the present invention, there is provided an optical fiber characteristic measurement device (1, 2) including: a first optical splitter (12) that splits frequency-modulated modulated light (L1) into pump light (LP) and reference light (LR); a second optical splitter (16) that causes the pump light to be incident from one end of an optical fiber under test (FUT) and outputs Brillouin scattered light (LS) generated inside the optical fiber under test; a first detector (19) that detects interference light between the Brillouin scattered light output from the second optical splitter and the reference light; an analyzer (20) that obtains a Brillouin gain spectrum which is a spectrum of the Brillouin scattered light from a detection signal (S1) output from the first detector; a second detector (22, 31) that detects a double wave component having a frequency that is double a modulation frequency of the modulated light included in an intensity component of each frequency of the Brillouin gain spectrum obtained by the analyzer; and a measurer (23) that measures characteristics of the optical fiber under test on the basis of the double wave component detected by the second detector.

In addition, in the optical fiber characteristic measurement device according to an aspect of the present invention, the second detector includes a heterodyne detector (22*a*) that obtains the double wave component by mixing the Brillouin gain spectrum obtained by the analyzer with a detection signal (Sd) having a frequency that is double the modulation frequency of the modulated light, and a filter (22*b*) that allows passage of the double wave component obtained by the heterodyne detector.

In addition, the optical fiber characteristic measurement device according to an aspect of the present invention further includes: a light source unit (11) that emits the modulated light; and a signal generator (10) that generates a modulation signal (Sm) having a modulation frequency of the modulated light supplied to the light source unit and the detection signal supplied to the heterodyne detector.

In addition, in the optical fiber characteristic measurement device according to an aspect of the present invention, a first converter (21) that converts the Brillouin gain spectrum obtained by the analyzer into a digital signal is included, the second detector detects the double wave component by performing digital signal processing on the Brillouin gain spectrum converted into a digital signal by the first converter, and the measurer measures the characteristics of the optical fiber under test by performing digital signal processing using the double wave component detected by the second detector.

In addition, in the optical fiber characteristic measurement device according to an aspect of the present invention, a second converter (32) that converts the double wave component detected by the second detector into a digital signal is included, and the measurer measures the characteristics of the optical fiber under test by performing digital signal processing using the double wave component converted into a digital signal by the second converter.

In addition, in the optical fiber characteristic measurement device according to an aspect of the present invention, the second detector obtains the double wave component by mixing the digital signal converted by the first converter with a detection signal having a frequency that is double the modulation signal.

In addition, in the optical fiber characteristic measurement device according to an aspect of the present invention, the second detector obtains the double wave component by mixing an analog signal of the Brillouin gain spectrum obtained by the analyzer with a detection signal having a frequency that is double the modulation signal.

In addition, in the optical fiber characteristic measurement device according to an aspect of the present invention, the signal generator generates a pulsed signal for pulsing the pump light, and a pulsator that uses the pulsed signal to pulse the pump light split by the first optical splitter is further included.

In addition, in the optical fiber characteristic measurement device according to an aspect of the present invention, the pulsator shapes the pump light into a pulse shape by performing intensity modulation on the pump light.

In addition, in the optical fiber characteristic measurement device according to an aspect of the present invention, the pulsator changes an optical frequency of the pump light into a pulse shape by performing frequency modulation on the pump light.

According to an aspect of the present invention, there is provided an optical fiber characteristic measurement method including: causing a first optical splitter (12) to split frequency-modulated modulated light (L1) into pump light (LP) and reference light (LR) (S12); causing a second optical splitter (16) to cause the pump light to be incident from one end of an optical fiber under test (FUT) and output Brillouin scattered light (LS) generated inside the optical fiber under test (S13); causing a first detector (19) to detect interference light between the Brillouin scattered light output from the second optical splitter and the reference light (S14); causing an analyzer (20) to obtain a Brillouin gain spectrum which is a spectrum of the Brillouin scattered light from a detection signal output from the first detector (S15); causing a second detector (22, 31) to detect a double wave component having a frequency that is double a modulation frequency of the modulated light included in an intensity component of each frequency of the Brillouin gain spectrum obtained by the analyzer (S16); and causing a measurer (23) to measure characteristics of the optical fiber under test on the basis of the double wave component detected by the second detector (S17).

In addition, the optical fiber characteristic measurement method according to an aspect of the present invention further includes: causing a heterodyne detector to obtain the double wave component by mixing the Brillouin gain spectrum obtained by the analyzer with a detection signal having a frequency that is double the modulation frequency of the modulated light; and causing a filter to allow passage of the double wave component obtained by the heterodyne detector.

In addition, the optical fiber characteristic measurement method according to an aspect of the present invention further includes: causing a light source unit to emit the modulated light; and causing a signal generator to generate a modulation signal having a modulation frequency of the modulated light supplied to the light source unit and the detection signal supplied to the heterodyne detector.

In addition, the optical fiber characteristic measurement method according to an aspect of the present invention further includes: causing a first converter to convert the Brillouin gain spectrum obtained by the analyzer into a digital signal; causing the second detector to detect the double wave component by performing digital signal processing on the Brillouin gain spectrum converted into a digital signal by the first converter; and causing the measurer to measure the characteristics of the optical fiber under test by performing digital signal processing using the double wave component detected by the second detector.

In addition, the optical fiber characteristic measurement method according to an aspect of the present invention further includes: causing a second converter to convert the double wave component detected by the second detector into a digital signal; and causing the measurer to measure the characteristics of the optical fiber under test by performing digital signal processing using the double wave component converted into a digital signal by the second converter.

In addition, the optical fiber characteristic measurement method according to an aspect of the present invention further includes causing the second detector to obtain the double wave component by mixing the digital signal converted by the first converter with a detection signal having a frequency that is double the modulation signal.

In addition, the optical fiber characteristic measurement method according to an aspect of the present invention further includes causing the second detector to obtain the double wave component by mixing an analog signal of the Brillouin gain spectrum obtained by the analyzer with a detection signal having a frequency that is double the modulation signal.

In addition, the optical fiber characteristic measurement method according to an aspect of the present invention further includes: causing the signal generator to generate a pulsed signal for pulsing the pump light; and causing a pulsator to use the pulsed signal to pulse the pump light split by the first optical splitter.

In addition, the optical fiber characteristic measurement method according to an aspect of the present invention further includes causing the pulsator to shape the pump light into a pulse shape by performing intensity modulation on the pump light.

In addition, the optical fiber characteristic measurement method according to an aspect of the present invention further includes causing the pulsator to change an optical frequency of the pump light into a pulse shape by performing frequency modulation on the pump light.

Advantageous Effects of Invention

According to the present invention, there is an effect that stable measurement can be performed in a shorter time than before.

DESCRIPTION OF EMBODIMENTS

Hereinafter, an optical fiber characteristic measurement device and an optical fiber characteristic measurement method according to an embodiment of the present invention will be described in detail with reference to the accompanying drawings. Hereinafter, an overview of embodiments of the present invention will be described first, and then the details of each embodiment of the present invention will be described.

OVERVIEW

Embodiments of the present invention make it possible to perform stable measurement in a shorter time than before. Specifically, the time required for measurement is made shorter than before by shortening (or eliminating) a process of removing noise superimposed on the Brillouin gain spectrum which is a spectrum of Brillouin scattered light emitted from an optical fiber under test. In addition, stable measurement can be performed by suppressing level fluctuations in the Brillouin gain spectrum and stabilizing a baseline.

Since the Brillouin scattered light emitted from an optical fiber under test is weak, the Brillouin gain spectrum obtained by an optical fiber characteristic measurement device using the BOCDR method may have noise superimposed thereon or have an unstable baseline. For this reason, a conventional optical fiber characteristic measurement device using the BOCDR method needs to perform a process for removing noise superimposed on the Brillouin gain spectrum over a long time, which results in a long measurement time. In addition, since the baseline is unstable due to level fluctuations in the Brillouin gain spectrum, it has been difficult to perform stable measurement.

In the embodiments of the present invention, modulated light that has undergone frequency modulation is first split into pump light and reference light, and the pump light is caused to be incident from one end of an optical fiber under test to obtain Brillouin scattered light generated inside the optical fiber under test. Next, interference light between the Brillouin scattered light and the reference light is detected to obtain a Brillouin gain spectrum which is a spectrum of the Brillouin scattered light. A double wave component having a frequency that is double the modulation frequency of the modulated light included in the intensity component of each frequency of the obtained Brillouin gain spectrum is then detected, and the characteristics of the optical fiber under test are measured on the basis of the detected double wave component. This makes it possible to perform stable measurement in a shorter time than before.

First Embodiment

<Configuration of Optical Fiber Characteristic Measurement Device>

Figure 1:
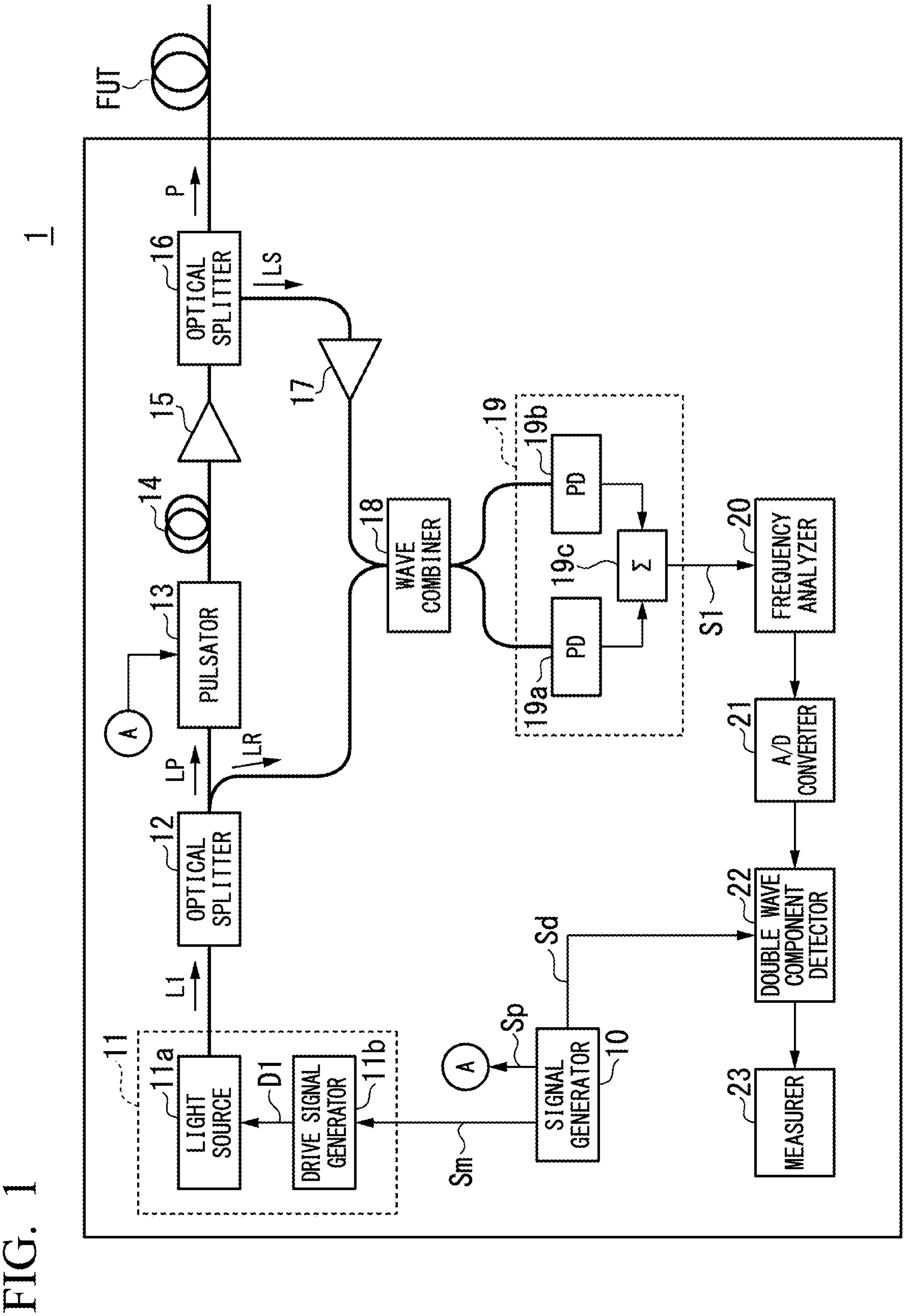
FIG. 1 is a block diagram illustrating main components of an optical fiber characteristic measurement device according to a first embodiment of the present invention.

FIG. 1 is a block diagram illustrating main components of an optical fiber characteristic measurement device according to a first embodiment of the present invention. As shown in FIG. 1, an optical fiber characteristic measurement device 1 of the present embodiment includes a signal generator 10, a light source unit 11, an optical splitter 12 (first optical splitter), a pulsator 13, an optical delayer 14, an optical amplifier 15, an optical splitter 16 (second optical splitter), an optical amplifier 17, a wave combiner 18, an optical detector 19 (first detector), a frequency analyzer 20 (analyzer), an A/D converter 21 (first converter), a double wave component detector 22 (second detector), and a measurer 23.

The optical fiber characteristic measurement device 1 of the present embodiment is an optical fiber characteristic measurement device using a so-called BOCDR method which measures the characteristics of an optical fiber under test FUT on the basis of Brillouin scattered light LS obtained by causing pump pulse light P to be incident on the optical fiber under test FUT. Meanwhile, the above pump pulse light P is light obtained by pulsing pump light LP serving as continuous light that has undergone frequency modulation. In addition, the above Brillouin scattered light LS is back-scattered light generated by Brillouin scattering within the optical fiber under test FUT.

Any optical fiber under test FUT can be used depending on the wavelength of the pump pulse light P, or the like. In addition, in the present embodiment, it is assumed that the length of the optical fiber under test FUT is longer than an interval dm between correlation peaks, and that a plurality of correlation peaks exist in the optical fiber under test FUT.

The signal generator 10 generates a modulation signal Sm supplied to the light source unit 11, a pulsed signal Sp supplied to the pulsator 13, and a detection signal Sd supplied to the double wave component detector 22. The modulation signal Sm is a signal for outputting frequency-modulated continuous light L1 (modulated light) from the light source unit 11. The frequency (modulation frequency fin) of the modulation signal Sm is swept in a frequency range specified in advance. The pulsed signal Sp is a signal for pulsing the pump light LP serving as continuous light. The detection signal Sd is a signal having twice the frequency of the modulation signal Sm.

The light source unit 11 includes a light source 11*a* and a drive signal generator 11*b*, and outputs the frequency-modulated continuous light L1 using the modulation signal Sm output from the signal generator 10. The light source 11*a* includes, for example, a semiconductor laser element such as a distributed feed-back laser diode (DFB-LD), and outputs the frequency-modulated continuous light L1 in accordance with a drive signal D1 output from the drive signal generator 11*b*.

The drive signal generator 11*b* generates the drive signal D1 for outputting the frequency-modulated continuous light L1 from the light source 11*a* using the modulation signal Sm output from the signal generator 10. Specifically, the drive signal generator 11*b* generates the drive signal D1 by adding a DC bias current and a sinusoidal AC current. This drive signal D1 is a sinusoidal signal, and its frequency (modulation frequency fm) is specified by the modulation signal Sm supplied from the signal generator 10.

The optical splitter 12 splits the continuous light L1 output from the light source unit 11 into the pump light LP and reference light LR having an intensity ratio specified in advance (for example, 1 to 1). The pulsator 13 pulses the pump light LP split by the first optical splitter 12 using the pulsed signal Sp output from the signal generator 10. The reason for providing such a pulsator 13 is to obtain the pump pulse light P used in a time-gating method. Here, the pulse width tpw of the pump pulse light P is set so that only one correlation peak is included in the pump pulse light P when the pump pulse light P propagates within the optical fiber under test FUT. Specifically, the pulse width tpw of the pump pulse light P is set so that the following Expression (1) is satisfied.

$$tpw \leq 1/fm \qquad (1)$$

The optical delayer 14 delays the pump light LP (the pump pulse light P) pulsed by the pulsator 13 by a predetermined time. The optical delayer 14 includes, for example, an optical fiber of a predetermined length. The delay time can be adjusted by changing the length of the optical fiber. The reason for providing such an optical delayer 14 is to place a zero-order correlation peak of which the appearing position does not move even when the modulation frequency fm is swept outside the optical fiber under test FUT.

The optical amplifier 15 amplifies the pump pulse light P through the optical delayer 14. This optical amplifier 15 includes an optical amplifier such as, for example, an erbium doped fiber amplifier (EDFA), and amplifies the pump pulse light P at a predetermined amplification factor.

The optical splitter 16 includes a first port, a second port, and a third port. The first port is connected to the optical amplifier 15. The second port is connected to the optical fiber under test FUT. The third port is connected to the optical amplifier 17. The optical splitter 16 outputs the pump pulse light P input from the first port to the second port. In addition, the Brillouin scattered light LS from the optical fiber under test FUT input from the second port is output to the third port. For example, an optical circulator can be used as such an optical splitter 16.

The optical amplifier 17 amplifies the Brillouin scattered light LS output from the third port of the optical splitter 16. Similarly to the optical amplifier 15, this optical amplifier 17 includes an optical amplifier such as, for example, an EDFA, and amplifies the Brillouin scattered light LS output from the third port of the optical splitter 16 at a predetermined amplification factor.

The wave combiner 18 combines the Brillouin scattered light LS amplified by the optical amplifier 17 and the reference light LR split by the optical splitter 12. In addition, the wave combiner 18 splits the combined light into two beams of light having an intensity ratio specified in advance (for example, 1 to 1) and outputs the split beams of light to the optical detector 19. Each of the two beams of light split by the wave combiner 18 includes, for example, 50% of the backscattered light from the optical fiber under test FUT and 50% of the reference light. For example, an optical coupler can be used as such a wave combiner 18.

The optical detector 19 performs optical heterodyne detection by causing the Brillouin scattered light LS and the reference light LR included in the two beams of light output from the wave combiner 18 to interfere with each other. The optical detector 19 includes, for example, a balanced photo diode composed of two photo diodes (PD) 19*a* and 19*b*, and a multiplexer 19*c*. The photo diodes 19*a* and 19*b* receive the two beams of light output from the wave combiner 18. The light reception signals of the photo diodes 19*a* and 19*b* are input to the multiplexer 19*c*. The multiplexer 19*c* outputs a detection signal S1 which is an interference signal (beat signal) indicating a frequency difference between the Brillouin scattered light LS and the reference light LR.

The frequency analyzer 20 performs frequency analysis on the detection signal S1 output from the optical detector 19. That is, the frequency analyzer 20 obtains a Brillouin gain spectrum from the detection signal S1 output from the optical detector 19. The frequency analyzer 20 includes, for example, an electrical spectrum analyzer (ESA). The frequency analyzer 20 fetches the detection signal S1 output from the optical detector 19 during a period specified in a time-gating method. This makes it possible to measure the characteristics of the optical fiber under test FUT without any problem even when a plurality of correlation peaks exist in the optical fiber under test FUT.

Meanwhile, the frequency analyzer 20 may be configured to include a time axis measurer such as an oscilloscope and a converter that performs fast Fourier transform (FFT) instead of the spectrum analyzer. The frequency analyzer 20 having such a configuration converts time-continuous data acquired by the time axis measurer into spectrum data using the converter.

The A/D converter 21 converts the Brillouin gain spectrum obtained by the frequency analyzer 20 into a digital signal. Meanwhile, in a case where the frequency analyzer 20 includes a converter that performs fast Fourier transform, the A/D converter 21 can be omitted because the frequency analyzer 20 outputs spectrum data (a Brillouin gain spectrum converted into a digital signal).

The double wave component detector 22 performs digital signal processing on the Brillouin gain spectrum converted into a digital signal by the A/D converter 21 to detect a double wave component included in the intensity component of each frequency of the Brillouin gain spectrum obtained by the frequency analyzer 20. Here, the double wave component is a component having a frequency (2fm) that is double the modulation frequency fin of the continuous light L1. The reason for detecting such a double wave component is to perform stable measurement in a shorter time than before by removing noise superimposed on the Brillouin gain spectrum obtained by the frequency analyzer 20 and suppressing fluctuations in the baseline.

This double wave component indicates the intensity at the frequency (2fm) of the Brillouin gain spectrum obtained by the frequency analyzer 20, and its magnitude fluctuates depending on at which position in the optical fiber under test FUT the Brillouin gain spectrum is obtained. For example, in a case where the Brillouin gain spectrum obtained by the frequency analyzer 20 is obtained at a position where a correlation peak appears, the magnitude of the double wave component is the largest.

Figure 2:
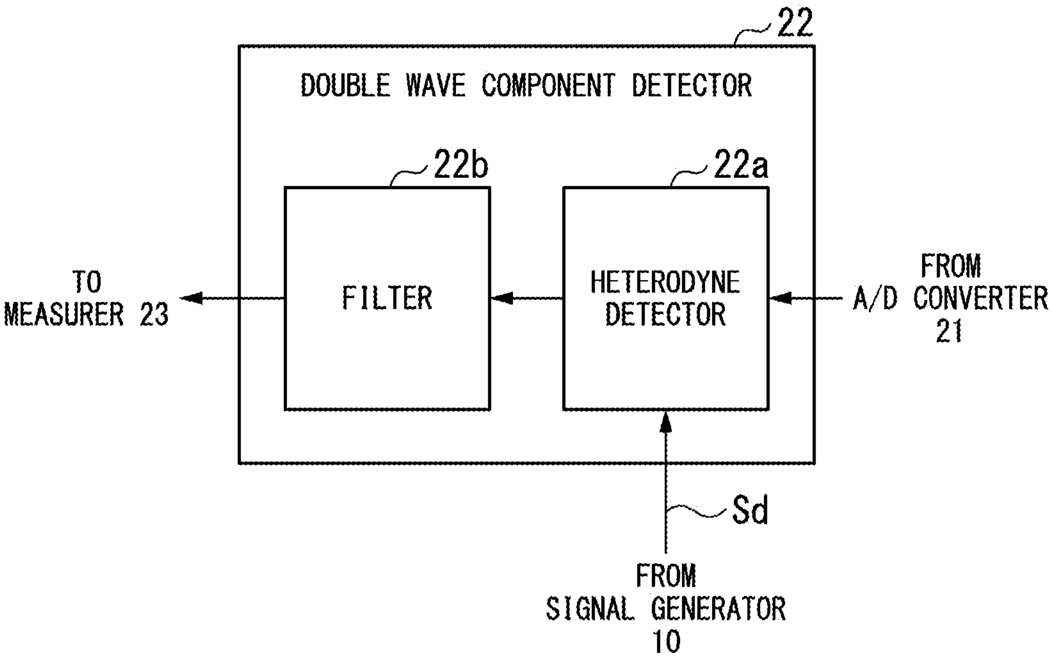
FIG. 2 is a block diagram illustrating an internal configuration of a double wave component detector in the first embodiment of the present invention.

FIG. 2 is a block diagram illustrating an internal configuration of a double wave component detector in the first embodiment of the present invention. As shown in FIG. 2, the double wave component detector 22 includes a heterodyne detector 22*a* and a filter 22*b*. The heterodyne detector 22*a* mixes the digital signal converted by the A/D converter 21 with the detection signal Sd output from the signal generator 10 to obtain a double wave component. The filter 22*b* allows passage of the double wave component obtained by the heterodyne detector 22*a*. For example, a bandpass filter or a low-pass filter can be used as this filter 22*b*.

The measurer 23 measures the characteristics of the optical fiber under test FUT on the basis of the double wave component detected by the double wave component detector 22. Specifically, the measurer 23 performs digital processing using the double wave component detected by the double wave component detector 22 to obtain the peak frequency of the Brillouin gain spectrum. The amount of Brillouin frequency shift is then obtained from the obtained peak frequency, and this amount of Brillouin frequency shift is converted into the magnitude of distortion applied to the optical fiber under test FUT or a change in temperature. Meanwhile, the measurer 23 may include a display that displays the double wave component detected by the double wave component detector 22, the measured characteristics (for example, distortion distribution) of the optical fiber under test FUT, or the like. The display is, for example, a liquid crystal display, an organic electro luminescence (EL) display device, or the like.

<Operation of Optical Fiber Characteristic Measurement Device>

Figure 3:
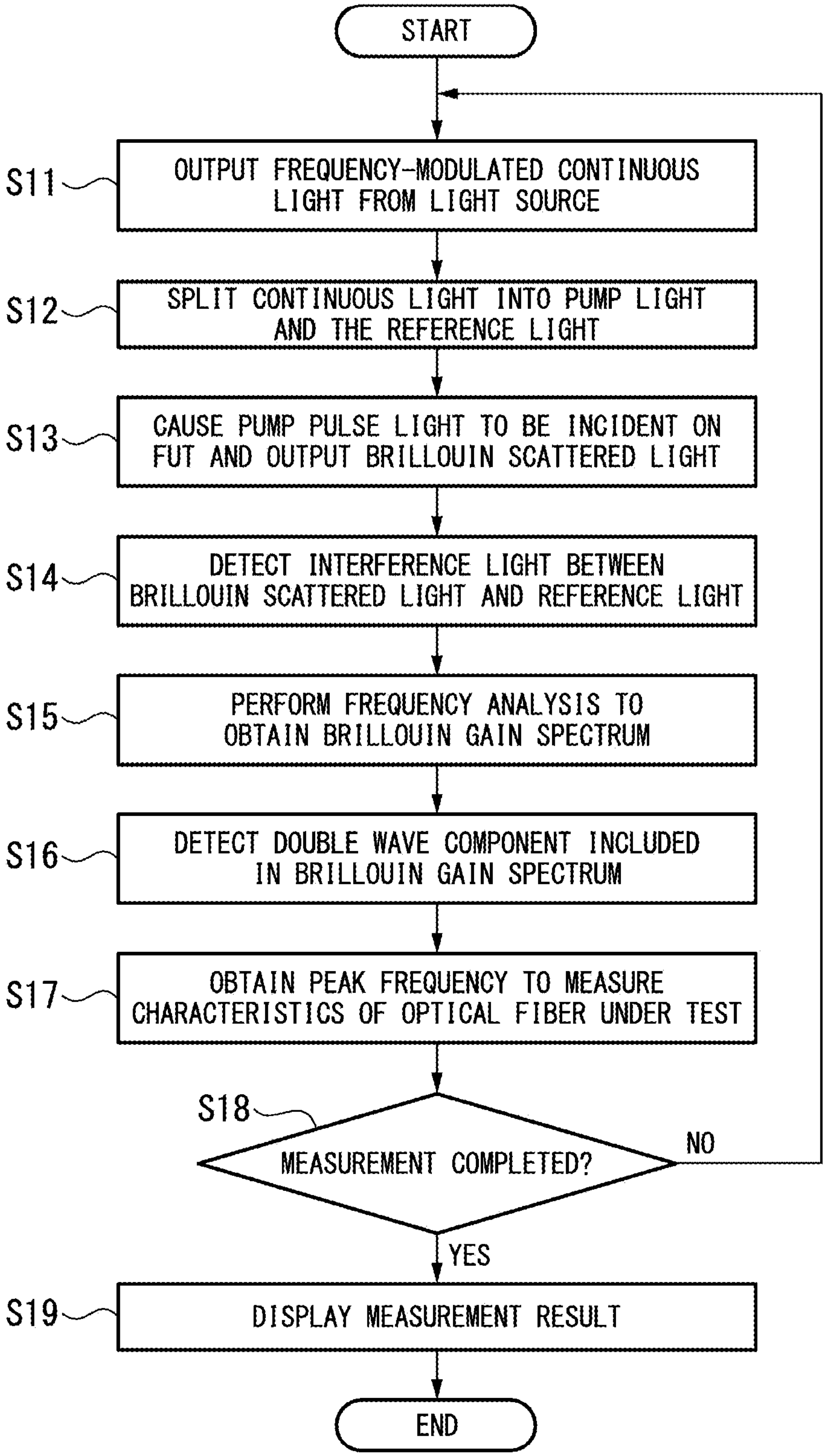
FIG. 3 is a flowchart illustrating an operation example of the optical fiber characteristic measurement device according to the first embodiment of the present invention.

FIG. 3 is a flowchart illustrating an operation example of the optical fiber characteristic measurement device according to the first embodiment of the present invention. The flowchart shown in FIG. 3 shows the operation when the characteristics of the optical fiber under test FUT in its lengthwise direction are measured. Meanwhile, the flowchart shown in FIG. 3 is started, for example, when the optical fiber characteristic measurement device 1 is instructed to start measurement.

When the process of the flowchart shown in FIG. 3 is started, the modulation signal Sm is first output from the signal generator 10 to the drive signal generator 11*b*. Then, the drive signal D1 is output from the drive signal generator 11*b* to the light source 11*a*, and the continuous light L1 frequency-modulated at the modulation frequency fm is output from the light source 11*a* (step S11). Meanwhile, the pulsed signal Sp is output from the signal generator 10 to the pulsator 13, and the detection signal Sd is output from the signal generator 10 to the double wave component detector 22.

The continuous light L1 output from the light source 11*a* is incident on the optical splitter 12 and is split into the pump light LP and the reference light LR (step S12: first optical split step). The split pump light LP is incident on the pulsator 13 and is pulsed by the pulsed signal Sp output from the signal generator 10. Thereby, the pump pulse light P is output from the pulsator 13. This pump pulse light P passes through the optical delayer 14, the optical amplifier 15, and the optical splitter 16 in this order, is then incident on the optical fiber under test FUT, and propagates within the optical fiber under test FUT (step S13: second optical split step).

Along with this, the Brillouin scattered light LS (backscattered light) is sequentially generated inside the optical fiber under test FUT. The Brillouin scattered light LS generated inside the optical fiber under test FUT propagates in a direction opposite to the direction in which the pump light LP propagates, and is emitted from one end of the optical fiber under test FUT. The Brillouin scattered light LS emitted from one end of the optical fiber under test FUT is incident on the wave combiner 18 through the optical splitter 16 and the optical amplifier 17 in this order (step S13: second optical split step).

The Brillouin scattered light LS incident on the wave combiner 18 is combined with the reference light LR split by the optical splitter 12, and its interference light is detected by the optical detector 19 (step S14: first detection step). When the above interference light is detected, the detection signal S1 is output from the optical detector 19 to the frequency analyzer 20. When the detection signal S1 is input to the frequency analyzer 20, frequency analysis of the detection signal S1 is performed in the frequency analyzer 20, and a Brillouin gain spectrum is obtained (step S15: analysis step).

The Brillouin gain spectrum obtained by the frequency analyzer 20 is converted into a digital signal by the A/D converter 21 and then input to the double wave component detector 22. In the double wave component detector 22, digital signal processing is performed on the Brillouin gain spectrum converted into a digital signal by the A/D converter 21, and the double wave component included in the intensity component of each frequency of the Brillouin gain spectrum obtained by the frequency analyzer 20 is detected (step S16: second detection step).

Next, the measurer 23 performs a process of obtaining the peak frequency of the Brillouin gain spectrum by performing digital processing using the double wave component detected by the double wave component detector 22. The measurer 23 performs a process of obtaining the amount of Brillouin frequency shift from the obtained peak frequency, converting this amount of Brillouin frequency shift into the magnitude of distortion applied to the optical fiber under test FUT, a change in temperature, or the like, and measuring the characteristics of the optical fiber under test FUT (step S17: measurement step).

When the above processing is completed, a controller (not shown) determines whether the measurement is completed (step S18). For example, it is determined whether the measurement has been completed for all measurement points of the optical fiber under test FUT in its lengthwise direction (whether sweep has been completed). In a case where the controller determines that the measurement is not completed (in a case where the determination result in step S18 is "NO"), the process returns to step S11, the position of the measurement point is changed to reset the modulation frequency fin of the light source 11*a*, and then the processes steps S11 to S17 are performed.

On the other hand, in a case where the controller (not shown) determines that the measurement has been completed (in a case where the determination result in step S18 is "YES"), the measurer 23 performs, for example a process of displaying the measurement result (step S19). For example, a process of displaying a graph (graph showing distortion distribution) in which the horizontal axis is the position of the optical fiber under test FUT in its lengthwise direction and the vertical axis is the magnitude of distortion applied to the optical fiber under test FUT is performed. With the above processing, a series of processes shown in FIG. 3 is completed.

Figure 4A:
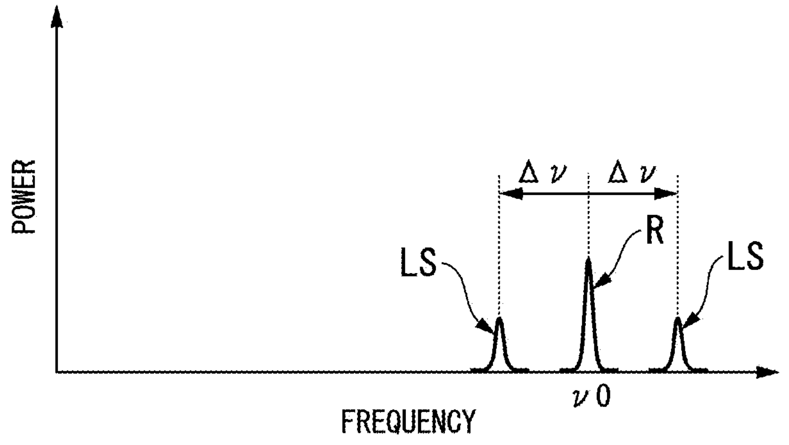
FIG. 4A is a diagram illustrating the principle of detection of Brillouin scattered light in the first embodiment of the present invention.
Figure 4B:
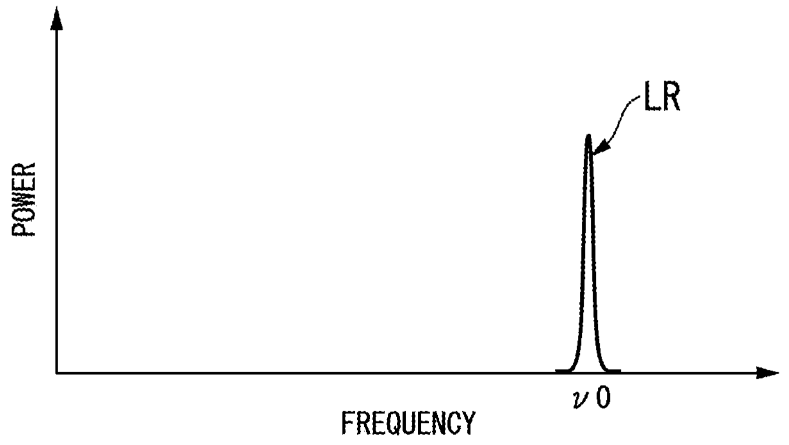
FIG. 4B is a diagram illustrating the principle of detection of the Brillouin scattered light in the first embodiment of the present invention.
Figure 4C:
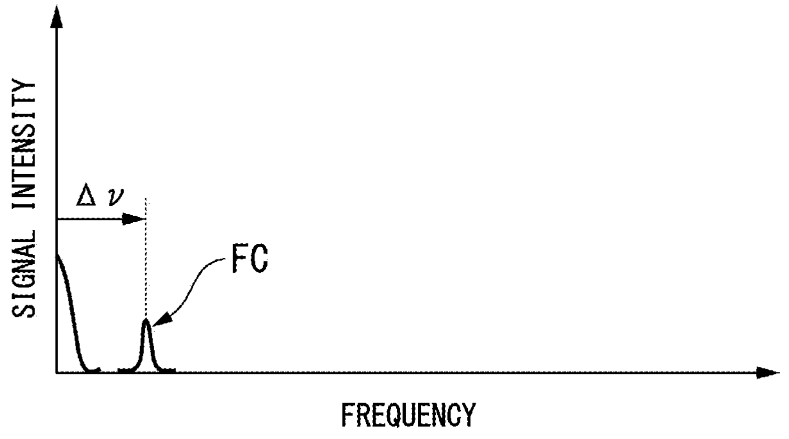
FIG. 4C is a diagram illustrating the principle of detection of the Brillouin scattered light in the first embodiment of the present invention.
Figure 5A:
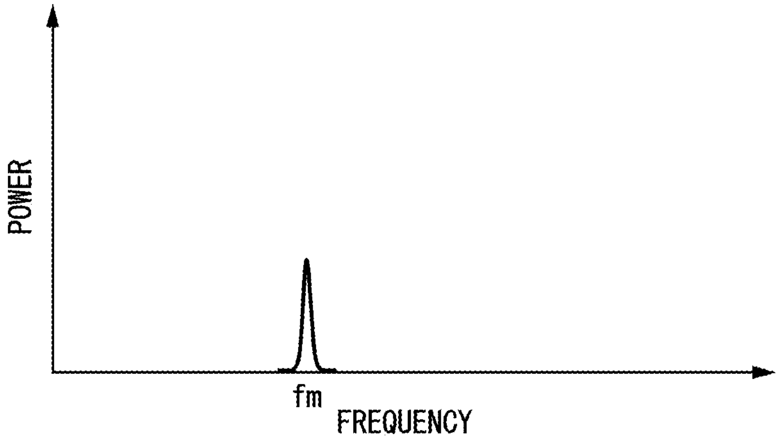
FIG. 5A is a diagram illustrating the principle of detection of the Brillouin scattered light in the first embodiment of the present invention.
Figure 5B:
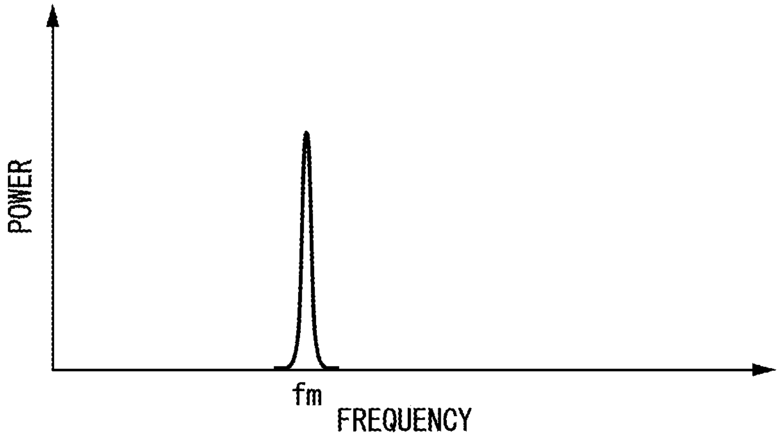
FIG. 5B is a diagram illustrating the principle of detection of the Brillouin scattered light in the first embodiment of the present invention.
Figure 5C:
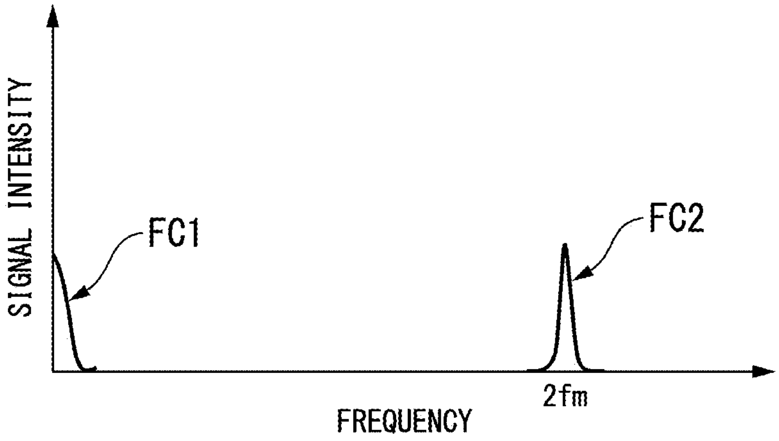
FIG. 5C is a diagram illustrating the principle of detection of the Brillouin scattered light in the first embodiment of the present invention.

FIGS. 4A to 4C and FIGS. 5A to 5C are diagrams illustrating the principle of detection of Brillouin scattered light in the first embodiment of the present invention. Here, since the pump pulse light P incident on the optical fiber under test FUT is frequency-modulated at the modulation frequency fm, the Brillouin scattered light LS emitted from the optical fiber under test FUT is also frequency-modulated at the modulation frequency fm. Therefore, hereinafter, a first frequency domain on the order of GHz or higher including the amount of Brillouin frequency shift and a second frequency domain on the order of MHz including the modulation frequency fm of the pump pulse light P will be described separately. Meanwhile, FIGS. 4A to 4C are diagrams illustrating the first frequency domain, and FIGS. 5A to 5C are diagrams illustrating the second frequency domain.

FIG. 4A is a graph illustrating a spectrum of the backscattered light emitted from the optical fiber under test FUT in the first frequency domain, and FIG. 4B is a graph illustrating a spectrum of the reference light LR in the first frequency domain. In addition, FIG. 4C is a graph illustrating a frequency component of the detection signal S1 in the first frequency domain. As shown in FIG. 4A, the backscattered light emitted from the optical fiber under test FUT includes Rayleigh scattered light R of the pump pulse light P and the Brillouin scattered light LS. The frequency ν0 of the Rayleigh scattered light R is, for example, about 200 [THz]. The frequency of the Brillouin scattered light LS is ν0±Δν, where Δν is the amount of Brillouin frequency shift. Meanwhile, the amount of Brillouin frequency shift Δν is, for example, about 11 [GHz].

When the backscattered light shown in FIG. 4A and the reference light LR shown in FIG. 4B are combined by the wave combiner 18 and the interference light is detected by the optical detector 19, the detection signal S1 having a frequency component shown in FIG. 4C is obtained from the optical detector 19. As shown in FIG. 4C, the frequency component of the detection signal S1 indicates the difference frequency (Δν) between the backscattered light shown in FIG. 4A and the reference light LR shown in FIG. 4B. Meanwhile, a sum frequency (2ν0+Δν) of the backscattered light shown in FIG. 4A and the reference light LR shown in FIG. 4B is also generated, but it is not included in the detection signal S1 because its frequency is excessively high.

The frequency component FC included in the detection signal S1 corresponds to the Brillouin scattered light LS. Therefore, the frequency analyzer 20 can obtain the amount of Brillouin frequency shift Δν by analyzing the spectrum of the frequency component FC included in the detection signal S1 and obtaining the peak frequency of the frequency component FC. In the measurer 23, the characteristics of the optical fiber under test FUT can be obtained by converting the amount of Brillouin frequency shift Δν into the magnitude of distortion applied to the optical fiber under test FUT or a change in temperature.

FIG. 5A is a graph illustrating a spectrum of the backscattered light emitted from the optical fiber under test FUT in the second frequency domain, and FIG. 5B is a graph illustrating a spectrum of the reference light LR in the second frequency domain. In addition, FIG. 5C is a graph illustrating a frequency component of the detection signal S1 in the second frequency domain. As shown in FIGS. 5A and 5B, the backscattered light and the reference light LR emitted from the optical fiber under test FUT are frequency-modulated at the modulation frequency fm. Meanwhile, the modulation frequency fm is, for example, about 5 [MHz] or 10 [MHz].

When the backscattered light shown in FIG. 5A and the reference light LR shown in FIG. 5B are combined by the wave combiner 18 and the interference light is detected by the optical detector 19, the detection signal S1 output from the optical detector 19 includes the frequency component shown in FIG. 5C. That is, as shown in FIG. 5C, it includes a frequency component FC1 indicating the difference frequency between the backscattered light shown in FIG. 5A and the reference light LR shown in FIG. 5B, and a frequency component FC2 indicating the sum frequency.

The frequency component FC1 indicates the intensity of the direct current (DC) component of the Brillouin gain spectrum obtained by the frequency analyzer 20, and the frequency component FC2 indicates the intensity at the frequency (2fm) of the Brillouin gain spectrum obtained by the frequency analyzer 20. Since these frequency components FC1 and FC2 indicate the difference frequency and sum frequency of the backscattered light shown in FIG. 5A and the reference light LR shown in FIG. 5B, respectively, the intensities of the frequency components FC1 and FC2 are equal to each other.

Conventionally, the frequency component FC1 shown in FIG. 5C (DC component obtained by the wave combiner 18 and the optical detector 19) has been used to indicate the intensity of each frequency of the Brillouin gain spectrum obtained by the frequency analyzer 20. However, this frequency component FC1 has a lot of noise and causes fluctuations in the baseline. Therefore, in the present embodiment, the double wave component detector 22 is provided at the subsequent stage of the frequency analyzer 20 to detect the double wave component (the frequency component FC2 shown in FIG. 5C) included in the intensity component of each frequency of the Brillouin gain spectrum obtained by the frequency analyzer 20. The detected double wave component is used as the intensity of each frequency of the Brillouin gain spectrum obtained by the frequency analyzer 20. This makes it possible to remove noise superimposed on the Brillouin gain spectrum obtained by the frequency analyzer 20, to suppress fluctuations in the baseline, and to perform stable measurement than before.

As described above, in the present embodiment, the frequency-modulated continuous light L1 is first split into the pump light LP and the reference light LR, and the pump light LP is converted into the pump pulse light P and then caused to be incident from one end of the optical fiber under test FUT to obtain the Brillouin scattered light LS generated inside the optical fiber under test. Next, the interference light between the Brillouin scattered light LS and the reference light LR is detected to obtain the Brillouin gain spectrum which is a spectrum of the Brillouin scattered light. A double wave component having a frequency that is double the modulation frequency of the modulated light included in the intensity component of each frequency of the obtained Brillouin gain spectrum is then detected, and the characteristics of the optical fiber under test is measured on the basis of the detected double wave component. This makes it possible to perform stable measurement in a shorter time than before.

Second Embodiment

<Configuration of Optical Fiber Characteristic Measurement Device>

Figure 6:
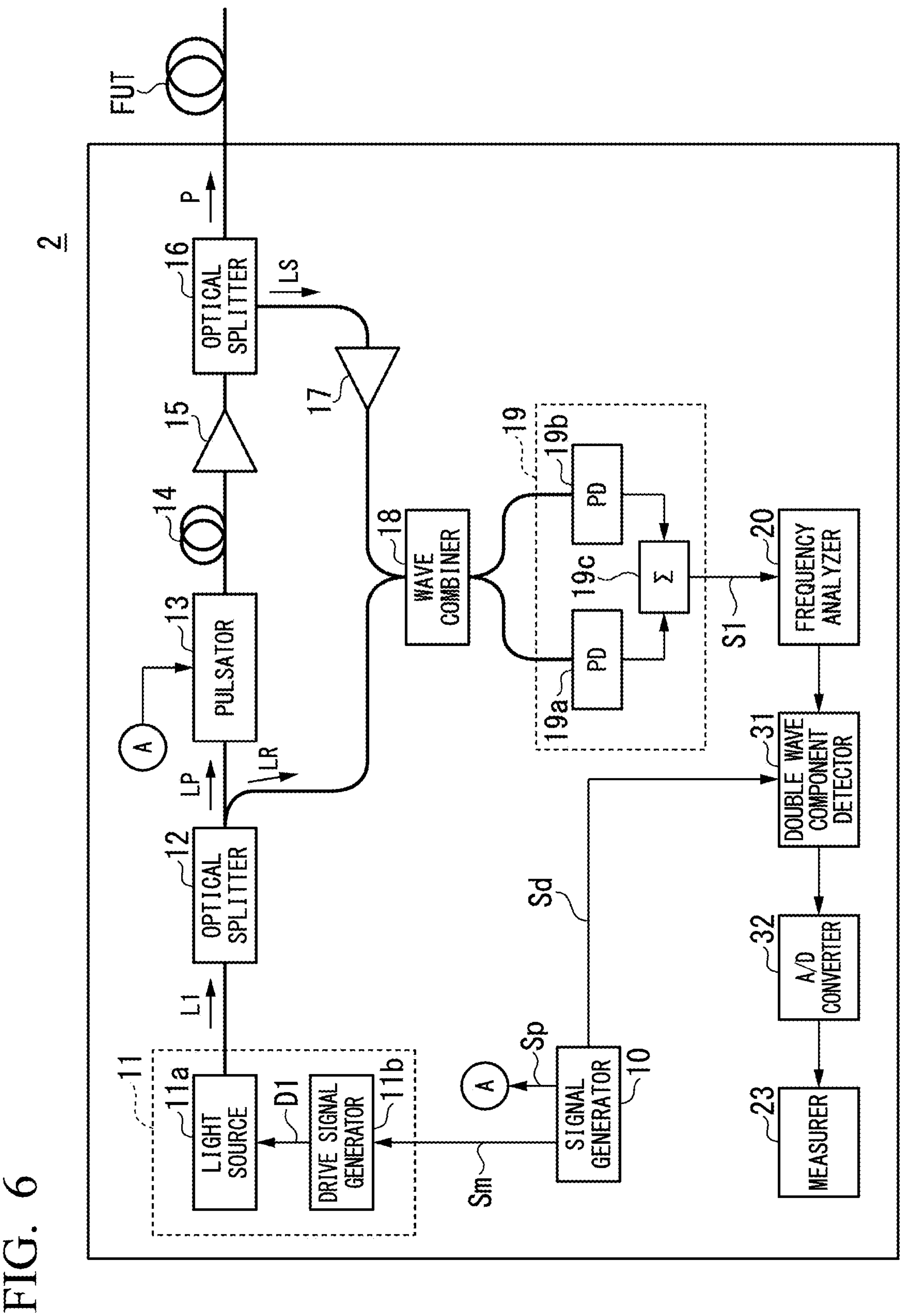
FIG. 6 is a block diagram illustrating main components of an optical fiber characteristic measurement device according to a second embodiment of the present invention.

FIG. 6 is a block diagram illustrating main components of an optical fiber characteristic measurement device according to a second embodiment of the present invention. Meanwhile, in FIG. 6, the same components as those shown in FIG. 1 are denoted by the same reference numerals and signs. As shown in FIG. 6, an optical fiber characteristic measurement device 2 of the present embodiment has a configuration in which the A/D converter 21 and the double wave component detector 22 of the optical fiber characteristic measurement device 1 shown in FIG. 1 are replaced with a double wave component detector 31 and an A/D converter 32 (second converter).

That is, the optical fiber characteristic measurement device 1 of the first embodiment described above performs digital signal processing to detect a double wave component. On the other hand, the optical fiber characteristic measurement device 2 of the present embodiment performs analog signal processing to detect a double wave component.

The double wave component detector 31 performs heterodyne detection on the Brillouin gain spectrum obtained by the frequency analyzer 20 to detect a double wave component included in the intensity component of each frequency of the Brillouin gain spectrum obtained by the frequency analyzer 20. Meanwhile, the only difference between the double wave component detector 31 included in the optical fiber characteristic measurement device 2 of the present embodiment and the double wave component detector 22 included in the optical fiber characteristic measurement device 1 shown in FIG. 1 is whether the double wave component is detected through analog signal processing or detected through digital signal processing.

Therefore, the double wave component detector 31 has a configuration equivalent to the heterodyne detector 22*a* and the filter 22*b* included in the double wave component detector 22 shown in FIG. 2. That is, the double wave component detector 31 includes a heterodyne detector that obtains a double wave component by mixing the Brillouin gain spectrum (analog signal) obtained by the frequency analyzer 20 with the detection signal Sd (analog signal) output from the signal generator 10. In addition, the double wave component detector 31 includes a filter that allows passage of the double wave component (analog signal) obtained by the heterodyne detector 22*a*.

The A/D converter 32 converts the double wave component detected by the double wave component detector 31 into a digital signal. The measurer 23 performs digital processing using the double wave component converted into a digital signal by the A/D converter 32 to measure the characteristics of the optical fiber under test FUT.

<Operation of Optical Fiber Characteristic Measurement Device>

The optical fiber characteristic measurement device 2 of the present embodiment differs from the optical fiber characteristic measurement device 1 of the first embodiment only in that the double wave component is detected through analog signal processing, and basically operates according to the flowchart shown in FIG. 3. Therefore, a detailed description of the operation of the optical fiber characteristic measurement device 2 of the present embodiment will be omitted.

As described above, similarly in the present embodiment, the frequency-modulated continuous light L1 is first split into the pump light LP and the reference light LR, and the pump light LP is converted into the pump pulse light P and then caused to be incident from one end of the optical fiber under test FUT to obtain the Brillouin scattered light LS generated inside the optical fiber under test. Next, the interference light between the Brillouin scattered light LS and the reference light LR is detected to obtain the Brillouin gain spectrum which is a spectrum of the Brillouin scattered light. A double wave component having a frequency that is double the modulation frequency of the modulated light included in the intensity component of each frequency of the obtained Brillouin gain spectrum is then detected, and the characteristics of the optical fiber under test is measured on the basis of the detected double wave component. This makes it possible to perform stable measurement in a shorter time than before.

Although the optical fiber characteristic measurement device and the optical fiber characteristic measurement method according to the embodiments of the present invention have been described above, the present invention is not limited to the above embodiments, and can be freely changed and modified within the scope of the present invention. For example, the pulsator 13 may perform intensity modulation on the pump light LP to shape the pump light LP into a pulse shape, or may perform frequency modulation on the pump light LP to change the optical frequency of the pump light LP into a pulse shape (swing the optical frequency significantly).

In addition, the optical delayer 14 may be provided between the optical splitter 12 and the wave combiner 18 or between the optical splitter 16 and the wave combiner 18, in addition to between the optical splitter 12 and the optical splitter 16. In addition, an optical amplifier that amplifies the reference light LR may be provided between the optical splitter 12 and the wave combiner 18.

In this specification, terms representing directions such as "front, rear, upper, lower, right, left, vertical, horizontal, longitudinal, transverse, row, and column" refer to such directions in a device of the present invention. Therefore, these terms in the specification of the present invention should be construed relatively in a device of the present invention.

A term such as "configured" is configured in order to execute functions of the present invention, or is used in order to represent a configuration, an element, or a portion of a device.

Further, the wording represented as "means plus function" in the claims should include every structure capable of being used in order to execute functions included in the present invention.

A term such as "unit" is used for representing a portion of software programmed in order to execute a component, a unit, hardware, or a desired function. A typical example of hardware is a device or a circuit, but is not limited thereto.

Hereinbefore, although preferred examples of the present invention have been described, the present invention is not limited to the examples. Additions, omissions, substitutions, and other changes of components can be made without departing from the spirit or scope of the present invention. The present invention is not limited by the above description, but is limited by only the appended claims.

REFERENCE SIGNS LIST

1, 2 Optical fiber characteristic measurement device
10 Signal generator
11 Light source unit
12 Optical splitter

16 Optical splitter
19 Optical detector
20 Frequency analyzer
21 A/D converter
22 Double wave component detector
22*a* Heterodyne detector
22*b* Filter
23 Measurer
31 Double wave component detector
32 A/D converter
FUT Optical fiber under test
L1 Continuous light
LP Pump light
LR Reference light
LS Brillouin scattered light
S1 Detection signal
Sm Modulation signal
Sd Detection signal

The invention claimed is:

1. An optical fiber characteristic measurement device comprising:

a first optical splitter that splits modulated light, for which frequency modulation has been performed, into pump light and reference light;

a second optical splitter that causes the pump light to be incident from one end of an optical fiber under test and outputs Brillouin scattered light generated inside the optical fiber under test;

a first detector that detects interference light between the Brillouin scattered light output from the second optical splitter and the reference light;

an analyzer that obtains a Brillouin gain spectrum which is a spectrum of the Brillouin scattered light from a detection signal output from the first detector;

a second detector that detects a double wave component having a frequency that is double a modulation frequency of the modulated light included in an intensity component of each frequency of the Brillouin gain spectrum obtained by the analyzer; and a measurer that uses the double wave component detected by the second detector to determine a peak frequency of the Brillouin gain spectrum, calculates a Brillouin frequency shift amount based on the peak frequency, and measures characteristics of the optical fiber under test on the basis of the Brillouin frequency shift amount.

2. The optical fiber characteristic measurement device according to claim 1, wherein the second detector comprises:

a heterodyne detector that obtains the double wave component by mixing the Brillouin gain spectrum obtained by the analyzer with a detection signal having a frequency that is double the modulation frequency of the modulated light; and a filter that allows passage of the double wave component obtained by the heterodyne detector.

3. The optical fiber characteristic measurement device according to claim 2, further comprising:

a light source unit that comprises a light source and a drive signal generator and emits the modulated light; and a signal generator that generates a modulation signal having a modulation frequency of the modulated light supplied to the light source unit and the detection signal supplied to the heterodyne detector.

4. The optical fiber characteristic measurement device according to claim 3, further comprising:

a first converter that converts the Brillouin gain spectrum obtained by the analyzer into a digital signal, wherein the second detector detects the double wave component by performing digital signal processing on the Brillouin gain spectrum converted into a digital signal by the first converter, and wherein the measurer measures the characteristics of the optical fiber under test by performing digital signal processing using the double wave component detected by the second detector.

5. The optical fiber characteristic measurement device according to claim 1, further comprising:

a second converter that converts the double wave component detected by the second detector into a digital signal, wherein the measurer measures the characteristics of the optical fiber under test by performing digital signal processing using the double wave component converted into a digital signal by the second converter.

6. The optical fiber characteristic measurement device according to claim 4, wherein the second detector obtains the double wave component by mixing the digital signal converted by the first converter with a detection signal having a frequency that is double the modulation signal.

7. The optical fiber characteristic measurement device according to claim 4, wherein the second detector obtains the double wave component by mixing an analog signal of the Brillouin gain spectrum obtained by the analyzer with a detection signal having a frequency that is double the modulation signal.

8. The optical fiber characteristic measurement device according to claim 3, wherein the signal generator generates a pulsed signal for pulsing the pump light, and wherein the optical fiber characteristic measurement device further comprises a pulsator that uses the pulsed signal to pulse the pump light split by the first optical splitter.

9. The optical fiber characteristic measurement device according to claim 8, wherein the pulsator shapes the pump light into a pulse shape by performing intensity modulation on the pump light.

10. The optical fiber characteristic measurement device according to claim 8, wherein the pulsator changes an optical frequency of the pump light into a pulse shape by performing frequency modulation on the pump light.

11. An optical fiber characteristic measurement method comprising:

splitting, by a first optical splitter, modulated light, for which frequency modulation has been performed, into pump light and reference light;

causing, by a second optical splitter, the pump light to be incident from one end of an optical fiber under test and outputting Brillouin scattered light generated inside the optical fiber under test;

detecting, by a first detector, interference light between the Brillouin scattered light output from the second optical splitter and the reference light;

obtaining, by an analyzer, a Brillouin gain spectrum which is a spectrum of the Brillouin scattered light from a detection signal output from the first detector;

detecting, by a second detector, a double wave component having a frequency that is double a modulation frequency of the modulated light included in an intensity component of each frequency of the Brillouin gain spectrum obtained by the analyzer; and measuring, by a measurer that uses the double wave component detected by the second detector to determine a peak frequency of the Brillouin gain spectrum and calculates a Brillouin frequency shift amount based on the peak frequency, characteristics of the optical fiber under test on the basis of the Brillouin frequency shift amount.

12. The optical fiber characteristic measurement method according to claim 11, further comprising:

obtaining, by a heterodyne detector, the double wave component by mixing the Brillouin gain spectrum obtained by the analyzer with a detection signal having a frequency that is double the modulation frequency of the modulated light; and allowing, by a filter, passage of the double wave component obtained by the heterodyne detector.

13. The optical fiber characteristic measurement method according to claim 12, further comprising:

emitting the modulated light by a light source unit that comprises a light source and a drive signal generator; and generating, by a signal generator, a modulation signal having a modulation frequency of the modulated light supplied to the light source unit and the detection signal supplied to the heterodyne detector.

14. The optical fiber characteristic measurement method according to claim 13, further comprising:

converting, by a first converter, the Brillouin gain spectrum obtained by the analyzer into a digital signal, detecting, by the second detector, the double wave component by performing digital signal processing on the Brillouin gain spectrum converted into a digital signal by the first converter, and measuring, by the measurer, the characteristics of the optical fiber under test by performing digital signal processing using the double wave component detected by the second detector.

15. The optical fiber characteristic measurement method according to claim 11, further comprising:

converting, by a second converter, the double wave component detected by the second detector into a digital signal; and measuring, by the measurer, the characteristics of the optical fiber under test by performing digital signal processing using the double wave component converted into a digital signal by the second converter.

16. The optical fiber characteristic measurement method according to claim 14, further comprising:

obtaining, by the second detector, the double wave component by mixing the digital signal converted by the first converter with a detection signal having a frequency that is double the modulation signal.

17. The optical fiber characteristic measurement method according to claim 14, further comprising:

obtaining, by the second detector, the double wave component by mixing an analog signal of the Brillouin gain spectrum obtained by the analyzer with a detection signal having a frequency that is double the modulation signal.

18. The optical fiber characteristic measurement method according to claim 13, further comprising:

generating, by the signal generator, a pulsed signal for pulsing the pump light; and using, by a pulsator, the pulsed signal to pulse the pump light split by the first optical splitter.

19. The optical fiber characteristic measurement method according to claim 18, further comprising:

shaping, by the pulsator, the pump light into a pulse shape by performing intensity modulation on the pump light.

20. The optical fiber characteristic measurement method according to claim 18, further comprising:

changing, by the pulsator, an optical frequency of the pump light into a pulse shape by performing frequency modulation on the pump light.

* * * * *